United States Patent [19]

Miller

[11] Patent Number: 4,574,269
[45] Date of Patent: Mar. 4, 1986

[54] VEHICLE COMMUNICATOR

[76] Inventor: Gregory R. Miller, 3831 Thyme Dr., #4, Rockford, Ill. 61111

[21] Appl. No.: 721,882

[22] Filed: Apr. 10, 1985

[51] Int. Cl.<sup>4</sup> ............................................. B60Q 1/00
[52] U.S. Cl. ........................................ 340/97; 340/87; 340/107; 340/798; 340/815.06
[58] Field of Search ...................... 340/97, 107, 87, 84, 340/122–124, 144–146, 705, 790, 798, 762, 811, 815.03, 815.06, 815.07, 815.15, 815.2

[56] References Cited

U.S. PATENT DOCUMENTS

| | | | |
|---|---|---|---|
| 2,138,976 | 12/1938 | Mason | 340/107 |
| 2,503,336 | 4/1950 | Hines | 340/107 |
| 2,843,952 | 7/1958 | Zgraggen | 340/107 |
| 3,226,707 | 12/1965 | Newman et al. | 340/107 |
| 3,299,552 | 1/1967 | Newman et al. | 340/107 |
| 3,299,553 | 1/1967 | Newman et al. | 340/107 |
| 3,469,235 | 9/1969 | Devlin et al. | 340/107 |
| 3,678,457 | 7/1972 | Lev | 340/107 |
| 3,750,138 | 7/1973 | Burgan et al. | 340/97 |
| 4,109,245 | 8/1978 | Hedin | 340/808 |
| 4,264,979 | 4/1981 | Gutowski | 340/107 |
| 4,353,063 | 10/1982 | Devlin | 340/87 |
| 4,361,828 | 11/1982 | Hose | 340/107 |
| 4,431,984 | 2/1984 | Bileck | 340/87 |

Primary Examiner—Donnie L. Crosland
Attorney, Agent, or Firm—Wood, Dalton, Phillips, Mason & Rowe

[57] ABSTRACT

A visual communicator for a rear window of a vehicle. The communicator is semi-transparent and adapted to be disposed in the rear window of the vehicle for viewing from outside of the vehicle. The degree of transparency is such as to accommodate normal use of an inside rearview mirror of the vehicle by a driver of the vehicle. The communicator also includes a message display unit including a plurality of light emitting diodes comprising in a matrix arrangement and disposed in a limited discrete portion of the rear window. The light emitting diodes are selectively energizable to emit light in the form of a message. The communicator further includes a message control unit operationally interconnected to the light emitting diodes for selectively energizing the light emitting diodes. The message control unit is programmed to energize the light emitting diodes in any one of a plurality of preselected patterns. With this arrangement, the preselected patterns form messages for viewing from outside of the vehicle upon selective actuation of the message control unit.

24 Claims, 7 Drawing Figures

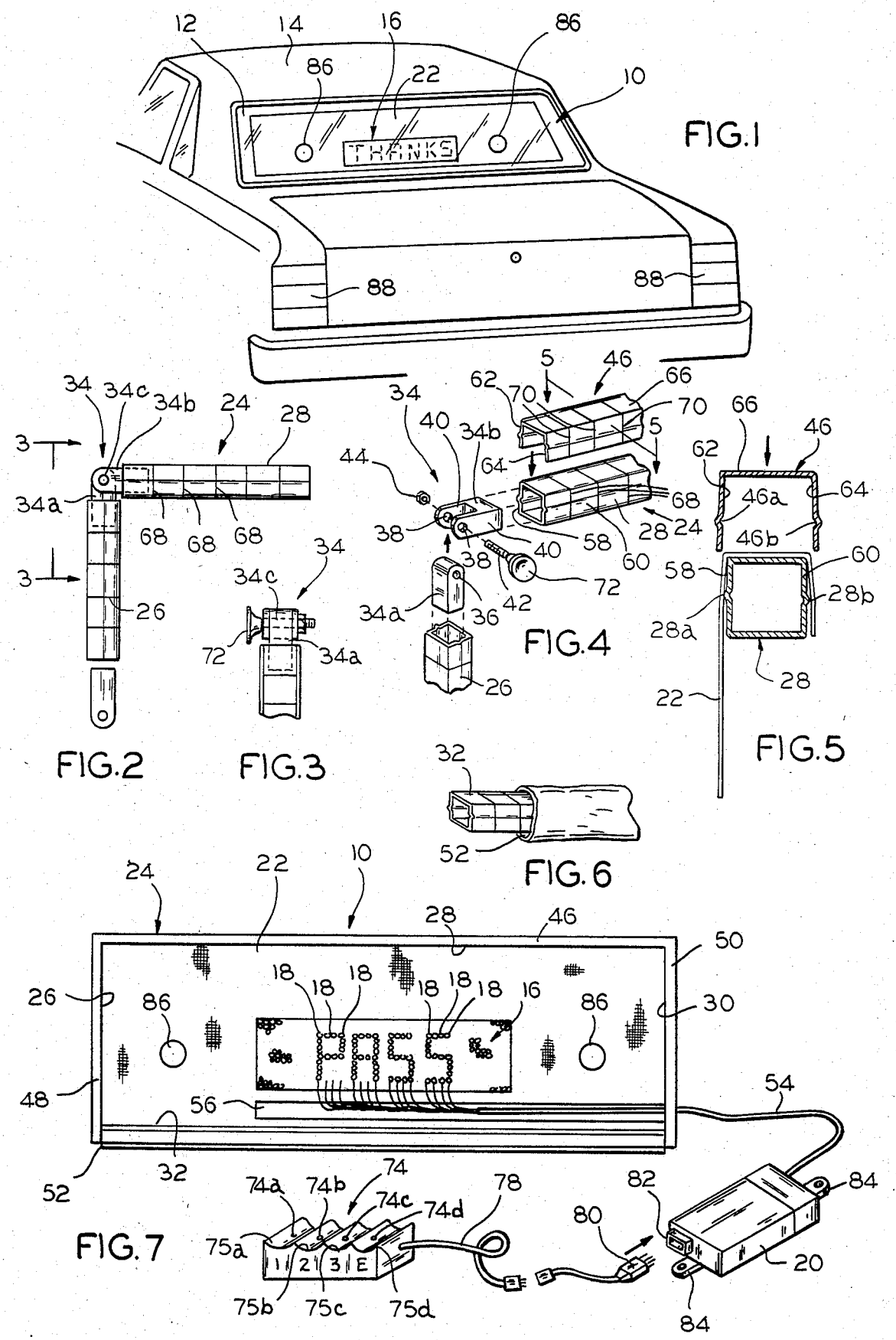

VEHICLE COMMUNICATOR

BACKGROUND OF THE INVENTION

The present invention relates to a device for selectively displaying messages and, more particularly, to a visual communicator for a rear window of a vehicle.

Over the years, many vehicle communication devices have been proposed including, in the most basic forms, fixed signs bearing appropriate messages. More recently, several signaling or communication devices have been suggested having the capability of individual selection of one of a plurality of messages for viewing externally of the vehicle. For instance, such messages may include a request of a following driver to dim lights or to avoid tailgating, to notify a following driver of road or traffic conditions ahead, to request passing drivers to send help or render assistance in an emergency, etc. Most recently, several message or communication devices have been suggested having a control unit in which messages can be programmed together with a display unit for a programmed message. However, in nearly every instance, such devices suffer from one or more serious drawbacks rendering them less than fully desirable.

In particular, such devices have usually been designed to sit on the rear deck of a vehicle in the rear window for viewing by a following motorist. This is most undesirable, however, because it interferes with normal use of an inside rearview mirror. The size and construction of such devices, as exemplified by U.S. Pat. Nos. 4,361,828 and 3,299,552, among others, create blind spots that could result in a serious accident by reason of a driver failing to see another nearby vehicle, for example, during a lane changing maneuver. This is not a problem, however, in some of the communication devices proposed in earlier times. Unfortunately, devices such as those proposed in U.S. Pat. Nos. 2,843,952 and 2,503,336 suffer from other serious drawbacks.

In particular, the latter devices are adapted to be mounted externally of a vehicle. This either requires some permanent modification to the vehicle or greatly restricts the ability of a motorist to add the device as an aftermarket accessory and, in any event, is subject to theft, breakage, or damage or obstruction by adverse weather and road conditions. Moreover, the installation of such devices is well beyond the usual capabilities of the average motorist.

Despite the many attempts to overcome the problems with signaling, message and communication devices, it has remained to provide a truly universal vehicle communicator capable of satisfying the requirements of motorists in an effective manner.

SUMMARY OF THE INVENTION

Accordingly, the present invention is directed to a visual communicator for a rear window of a vehicle. The communicator is semi-transparent and adapted to be disposed in the rear window of the vehicle for viewing from outside of the vehicle. The degree of transparency accommodates normal use of an inside rearview mirror of the vehicle by a driver of the vehicle. The communicator also includes a message display unit comprising a plurality of light emitting diodes selectively energizable to emit light in the form of a message. The light emitting diodes are in a matrix arrangement and disposed in a limited discrete portion of the rear window. The communicator further includes a message control unit operationally interconnected to the light emitting diodes for selectively energizing the light emitting diodes. The message control unit is programmed to energize the light emitting diodes in any one of a plurality of preselected patterns. With this arrangement, the preselected patterns form messages for viewing from outside of the vehicle upon selective actuation of the message control unit.

In a preferred embodiment, means for mounting a window screen is provided in the form of a frame which is dimensionally adjustable to substantially conform to the periphery of the rear window of the vehicle. The window screen, which is formed of a semi-transparent material and supports the light emitting diodes, is sized to overlap the frame in a position of maximum dimensional adjustment and is trimmable to substantially conform dimensionally to the periphery of the frame after adjustment. In addition, means are provided for securing the window screen to the periphery of the frame after trimming in the dimensionally adjusted position of the frame.

More particularly, the adjustable frame is preferably comprised of at least four tubular members adapted to be secured in a generally rectangular configuration. The window screen then also has a generally rectangular configuration dimensioned to overlap each of the tubular members of the frame which are advantageously square in cross section and are adapted to have their adjacent ends joined by means of a connector member. Still more particularly, the connector members each preferably include first and second portions joined by suitable hinge means.

In a preferred embodiment, the connector members are each formed such that the first portion is adapted for insertion into one of the tubular members and the second portion is adapted for insertion into the next adjacent of the tubular members. The hinge means then joins the first and second portions of the connector members for assembly of the adjustable frame in a manner accommodating pivotal movement of one of the tubular members relative to the next adjacent of the tubular members. In particular, the hinge means make it possible to form right angles between adjacent tubular members during assembly of the adjustable frame.

Additional details of the vehicle communicator include a plurality of screen retaining caps comprising the means for securing the window screen to the periphery of the frame. The caps are preferably adapted to securely retain the window screen in substantially conforming overlapping relation to at least three of the tubular members of the adjustable frame with the window screen having a pocket along one edge to receive the remaining one of the tubular members. With this arrangement, the message display unit is preferably disposed adjacent the pocket with the caps being adapted to securely retain the other three edges of the window screen.

In the preferred embodiment, the message control unit is operationally interconnected to the light emitting diodes by means of electrical wires. The electrical wires preferably extend from the light emitting diodes to the message control unit through a second pocket in the window screen. In particular, the second pocket preferably extends along the window screen between the light emitting diodes and the pocket provided for receiving one of the tubular members.

With regard to the adjustability feature of the frame, the tubular members and screen retaining caps each preferably include a plurality of break points adjacent at least one end thereof. The break points facilitate adjustment of the frame to substantially conform to the periphery of the rear window of the vehicle after which the frame may be assembled utilizing the connector members and the window screen may be trimmed to fit the frame. In addition, a plurality of suction cup fasteners associated with the adjustable frame so as to cooperate with the rear window of the vehicle are provided.

Still other objects, advantages and features of the present invention will be apparent from the following description when taken in conjunction with the accompanying drawings.

BRIEF DESCRIPTION OF THE DRAWINGS

FIG. 1 is a rear perspective view of a vehicle having a visual communicator in the rear window in accordance with the present invention;

FIG. 2 is a front elevational view illustrating a portion of an adjustable frame of the vehicle communicator of FIG. 1;

FIG. 3 is an end elevational view taken on the line 3—3 of FIG. 2 illustrating a portion of the adjustable frame of the vehicle communicator of FIG. 1;

FIG. 4 is an exploded perspective view illustrating a portion of the adjustable frame of the vehicle communicator of FIG. 1;

FIG. 5 is a cross sectional view taken on the line 5—5 of FIG. 4 illustrating a portion of the adjustable frame of the vehicle communicator of FIG. 1;

FIG. 6 is a perspective view illustrating a portion of the adjustable frame of the vehicle communicator of FIG. 1; and FIG. 7 is a perspective view illustrating the assembled relationship of all of the components of the vehicle communicator of FIG. 1.

DETAILED DESCRIPTION OF THE PREFERRED EMBODIMENT

In the illustration given, and with reference first to FIG. 1, the reference numeral 10 designates generally a visual communicator for a rear window 12 of a vehicle 14 in accordance with the present invention. The communicator 10 is semi-transparent and adapted to be disposed in the rear window 12 of the vehicle 14 for viewing from outside of the vehicle. The degree of transparency accommodates normal use of an inside rearview mirror of the vehicle 14 by a driver of the vehicle. The communicator 10 also includes a message display unit 16 including a plurality of light emitting diodes 18 in a matrix arrangement and disposed in a limited discrete portion of the rear window 12 (see FIGS. 1 and 7). The light emitting diodes 18 are selectively energizable to emit light in the form of a message. The communicator 10 further includes a message control unit 20 operationally interconnected to the light emitting diodes 18 for selectively energizing the light emitting diodes. The message control unit 20 is programmed to energize the light emitting diodes 18 in any one of a plurality of preselected patterns. With this arrangement, the preselected patterns form messages for viewing from outside of the vehicle upon activation of means for selectively actuating the message control unit 20 (as will be described in detail hereinafter).

Referring to FIGS. 2 through 6, the preferred embodiment includes means for mounting a window screen 22 in the rear window 12 of the vehicle 14 in the form of an adjustable frame 24. The frame 24 is dimensionally adjustable to substantially conform to the periphery of the rear window 12 of the vehicle 14 (see, also, FIG. 1), and the window screen 22, which is formed of a semi-transparent material and supports the light emitting diodes 18, is sized to overlap the frame 24 in a position of maximum dimensional adjustment (see FIG. 5). As will be appreciated, the window screen 22 is trimmable to substantially conform dimensionally to the periphery of the frame 24 after adjustment.

Referring to FIG. 7, the adjustable frame 24 is comprised of at least four tubular members 26, 28, 30 and 32 adapted to be secured in a generally rectangular configuration. The window screen 22 also has a generally rectangular configuration dimensioned to overlap each of the tubular members 26, 28 and 30 of the frame 24 (see FIG. 5). As shown in FIGS. 2 through 6, the tubular members 26, 28, 30 and 32 are generally square in cross section and a connector member 34 is provided for joining adjacent ends of the tubular members.

As best shown in FIG. 4, the connector members 34 each include a first portion 34a adapted for insertion into one of the tubular members and a second portion 34b adapted for insertion into the next adjacent of the tubular members. It will also be seen that hinge means 34c is provided for joining the first and second portions 34a and 34b of each of the connector members 34 for assembly of the adjustable frame 24 in a manner accommodating pivotal movement of one of the tubular members (such as 26) relative to the next adjacent of the tubular members (such as 28) to form a right angle during assembly of the adjustable frame 24 (see FIG. 2). As will be appreciated, the hinge means 34 are rendered inoperative after complete assembly of the adjustable frame 24 into a generally rectangular configuration with the window screen 16 secured thereto (as will be described in detail hereinafter).

Referring to FIGS. 2 through 4, the hinge means 34c can be understood in greater detail. Specifically, the hinge means 34c is formed by means of a bore 36 in the first portion 34a of the connector 34 and, with the second portion 34b of the connector 34 being in the form of a yoke and having a pair of aligned bores 38 in the spaced parallel arms 40 thereof, a threaded pin 42 may extend completely through the bores 38 and 40 and be secured therein by means of a nut 44. With this arrangement, the connector 34 provides a flexible joint between adjacent ones of the tubular members (such as 26 and 28) during assembly of the adjustable frame 24.

As will be appreciated by referring to FIGS. 4, 5 and 7, the means for securing the window screen 22 to the periphery of the adjustable frame 24 includes a plurality of screen retaining caps 46, 48 and 50. The caps (46, 48 and 50) are adapted to securely retain the window screen 22 in substantially conforming overlapping relation to at least three of the tubular members 28, 26 and 30, respectively, of the adjustable frame 24. In addition, the window screen 22 preferably includes a pocket 52 along one edge adapted to receive the remaining one of the tubular members 32 of the adjustable frame 24.

As shown in FIG. 7, the message display unit 16 is disposed adjacent the pocket 52 containing the tubular member 32, and the caps 46, 48 and 50 are adapted to securely retain the other three edges of the window screen 22 to the adjustable frame 24 in substantially conforming overlapping relation. The message control unit 20 is operationally interconnected to the light emitting diodes 18 forming the message display unit 16 by means of a plurality of electrical wires preferably commonly sheathed as at 54. As best shown in FIG. 7, the electrical wires extend from the light emitting diodes 18 to the message control unit 20 through a second pocket 56 formed in the window screen 22 between the message display unit 16 and the pocket 52.

Referring to FIGS. 4 and 5, at least the tubular members 26, 28 and 30 to be overlapped by edges of the window screen 22 have a pair of longitudinally extending projections (such as 28a and 28b) on oppositely facing parallel surfaces (such as 58 and 60), respectively. Each of the caps (such as 46) is then preferably in the form of a longitudinally extending channel defined by a pair of parallel walls (such as 62 and 64) joined along corresponding edges thereof by a top wall (such as 66). Moreover, the channels (such as 46) each have a pair of longitudinally extending indentations (such as 46b) to cooperate with the corresponding pairs of longitudinally extending projections (such as 28a and 28b) on the inwardly facing parallel walls (such as 62 and 64).

As best shown in FIG. 5, the trimmable edges of the window screen 22 are trimmable to overlap the pairs of longitudinally extending projections (such as 28a and 28b) on the oppositely facing parallel surfaces (such as 58 and 60) of the tubular members 26, 28 and 30. Each of the caps (such as 46, 48 and 50) is then adapted to be pressed onto the respective tubular members 28, 26 and 30 after the trimmable edges of the window screen 22 have been made to overlap the pairs of longitudinally extending projections (such as 28a and 28b). When this has been done, the pairs of longitudinally extending indentations on the inwardly facing parallel walls 46, 48 and 50 cooperate with the pairs of longitudinally extending projections on the oppositely facing parallel walls of the respective tubular members 28, 26 and 30.

Referring to FIGS. 2 and 4, the tubular members 26, 28, 30, and 32 each include a plurality of break points 68 adjacent at least one end thereof and the caps (such as 46) similarly include a plurality of break points (such as 70) adjacent at least one end thereof. It will be appreciated that the break points 68 and 70 facilitate adjustment of the frame 24 to substantially conform to the periphery of the rear window 12 of the vehicle 14 and, in the preferred embodiment, the tubular members 26, 28, 30 and 32 are generally square in cross section. Since the connector members 34 are similarly shaped, the tubular members 26, 28, 30 and 32 may be sized by utilizing the appropriate ones of the break points 68 and the connector members 34 may then be inserted into adjacent ends of the respective tubular members 26, 28, 30 and 32 to complete assembly of the adjustable frame 24.

As best shown in FIGS. 3 and 4, the communicator 10 includes means for securing the adjustable frame 24 in the rear window 12 of the vehicle 14. The securing means preferably includes a plurality of suction cup fasteners 72 associated with the adjustable frame 24 and, if desired, the suction cup fasteners 72 may be secured to the ends of the threaded pins 42 remote from the nuts 44. With this arrangement, the suction cup fasteners 72 will be provided at each of the four corners of the adustable frame 24 for cooperation in typical fashion with the rear window 12 of the vehicle 14.

Referring to FIG. 7, the means for selectively actuating the message control unit 22 can be understood in greater detail. It preferably comprises an alpha numeric key pad 74 having a plurality of buttons 74a, 74b, 74c and 74d adapted to be mounted on the sun visor or dash board of the vehicle 14 within easy reach of the driver and, in the form illustrated, three of the buttons 74a, 74b, 74c would be used to select a message already programmed into the message control unit 22 after which the fourth button 74d will be pressed to "enter" the message selected. As shown, the key pad 74 has a cord 78 of a length sufficient to extend to the message control unit 20 mounted on the rear deck of the vehicle 14.

Still referring to FIG. 7, the key pad 74 preferably includes a plug 80 on the end of the cord 78 adapted to be inserted into a mating receptacle 82 in the message control unit 20. It will be appreciated that the cord 78 may, if desired, be hidden from view by passing it under the carpet in the passenger compartment of the vehicle 14 for a permanent installation. In addition, the message control unit 20 may be permanently attached to the rear deck by utilizing appropriate fasteners with the flanges 84.

Referring to FIGS. 1 and 7, the message display unit 16 may be supplemented with brake and turn signal indicators 86 located in a position of maximum visibility to enhance safety. Drivers following the vehicle 14, including large trucks, will be more likely to visually recognize the normal signaling function of the tail lights 88 duplicated by the brake and turn signal indicators 86, thus avoiding a potential accident. While the brake and turn signal indicators 86 may be activated with the key pad 74, the more desirable approach will be to make a more permanent installation by wiring these indicators directly into the signalling functions of the tail lights 88 of the vehicle 14.

With the communicator 10, it is possible to convey simple messages to following drivers with a minimum of effort. For example, with the window screen 22 formed of a semitranparent silk screen material and the light emitting diodes 18 woven into the fabric, the four button key pad 74 may be utilized to display a desired message by pressing one or more of the buttons 74a, 74b, and 74c followed by the button 74d which could include the following inputs and displays:

| EXAMPLES | |
|---|---|
| Input | Display |
| 1E | Thanks |
| 2E | Sorry |
| 3E | Signal |
| 12E | Tires |
| 13E | Lites |
| 123E | Brake |
| 21E | Gas |
| 23E | Smoke |
| 213E | Pass |

As will be appreciated, other combinations of entries could be utilized for "OIL", "WATER", etc. Preferably, the most often used combinations would be the most easily remembered and, for the others, a handy reference chart which is easy to read would be supplied for attachment, e.g., to the visor or dash board. Moreover, the message control unit could be made programmable or, alternatively, replaceable with another unit having a more extensive vocabulary or sentence formation capabilities.

With the key pad 74, the buttons 74a, 74b, 74c and 74d are preferably located in arcuate depressions 75a, 75b, 75c and and 75d adapted to conform to the fingers of the driver. This permits easy tactile recognition so that the driver may utilize the key pad without diverting attention from the road, and the driver may, thus, enter a message while driving which may stay illuminated until, at a later point in time, the push button 74d is pushed alone or after a combination for displaying another message. In addition, the message control unit 20 can be programmed to remove a message after a fixed time period.

With the communicator 10 illustrated in the drawings, the window screen 22 covers substantially the entire rear window 12 providing a tinted glass effect for the driver. It is also possible, however, within the scope of the present invention to utilize the semi-transparent nature of my invention in a permanent original equipment installation by embedding the light emitting diodes and lead wires in the rear window or, as another alternative, to provide a partial window screen supported by a free standing base adapted to rest on the rear deck of the vehicle 14, although again the window screen will be formed of a semi-transparent material having a degree of transparency accommodating normal use of an inside rearview mirror with the light emitting diodes being supported by the window screen and the frame being adapted for permanent installation in the rear deck by utilizing appropriate fasteners, if desired. However, with the full window version of the communicator 10, the window screen 22 reduces glare, improves the efficiency of the electric rear-window defogger, and adds a degree of privacy from behind the vehicle 14.

As for installation of the communicator 10, the upper and lower frame members 28 and 32 are first removed from the carton and placed in the rear window 12 for sizing to the rear window 12 less approximately one inch on each side. The side tubular members 26 and 30 are then sized in essentially the same manner less approximately one inch on the top and bottom after which the connector members 34 are inserted into the ends of the tubular members 26, 28, 30 and 32 in seriatim fashion to form the rectangular frame 24. When this has been done, the assembled frame 24 is placed in the rear window 12 to confirm sizing and the caps (46, 48 and 50) are then similarly sized to conform to the length of the corresponding ones of the tubular members 26, 28 and 30.

After this step, the frame 24 is placed over the window screen 22 with the tubular member 32 even with the bottom edge of the window screen 22. The sides and top edges of the window screen 22 are then trimmed to be approximately two inches wider than the frame 24, but the bottom edge of the window screen is not trimmed since it contains the pocket 52. However, the pocket 52 is trimmed precisely at the ends of the tubular member 32 so that the connector members 34 stick out past the window screen 22.

When this has been done, the tubular member 32 is disassembled from the remainder of the frame 24 and inserted into the pocket 52. The frame 24 is then completely reassembled by utilizing the connector members 34 associated with the bottom ends of the tubular members 26 and 30 to once again join the tubular member 32 to the remainder of the frame 24. As this is being done, the frame 24 should remain relatively square as it will be in the rear window 12 after assembly is completed.

At this point, the top of the window screen 16 is grasped and pulled snuggly over the top of the frame 24. The window screen 22 is then secured to the frame 24 by pressing the cap 46 over the top of the tubular member 28 preferably by starting at one end of the tubular member 28 and working toward the other end thereof. When this has been done, the sides of the window screen 22 are secured to the tubular members 26 and 30 in the same manner and any excess window screen 22 is trimmed away.

With these steps completed, the suction cups 72 are utilized to secure the adjustable frame 24 in a centered position within the rear window and the message control unit 20 is then placed on the rear deck and, preferably, secured thereto by appropriate fasteners utilizing the flanges 84. Finally, the key pad 74 is placed in the desired location and the cable 78 is run in the desired manner to the rear deck for attachment to the message control unit 20 and the communicator 10 is ready for operation after connection to a source of electrical energy preferably in the form of a plug inserted into the cigarette lighter (not shown).

Various changes coming within the spirit of the present invention may suggest themselves to those skilled in the art. Hence, it will be understood that the invention is not to be limited to the specific embodiment shown and described or the uses mentioned. On the contrary, the specific embodiment and uses are intended to be merely exemplary with the present invention being limited only by the true spirit and scope of the appended claims.

I claim:

1. A visual communicator for a rear window of a vehicle comprising:

semi-transparent means adapted to be disposed in said rear window of said vehicle for viewing from outside of said vehicle, said semi-transparent means having a degree of transparency accommodating normal use of an inside rearview mirror of said vehicle by a driver of said vehicle;

a message display unit including a plurality of light emitting diodes arranged in a matrix, said light emitting diodes comprising at least a portion of semi-transparent means and being selectively energizable to emit light, said matrix being disposed in a limited discrete portion of said rear window;

a message control unit for selectively energizing said light emitting diodes, said message control unit being operationally interconnected to said light emitting diodes and being programmed to energize said light emitting diodes in any one of a plurality of preselected patterns, said preselected patterns forming messages for viewing from outside of said vehicle; and means for selectively actuating said message control unit.

2. The visual communicator as defined by claim 1 wherein said semi-transparent means also comprises a window screen formed of a semi-transparent material and including means for mounting said window screen in said rear window of said vehicle, said light emitting diodes being supported by said window screen.

3. The visual communicator as defined by claim 2 wherein said means for mounting said window screen in said rear window of said vehicle is an adjustable frame, said frame being dimensionally adjustable to substantially conform to the periphery of said rear window of said vehicle.

4. The visual communicator as defined by claim 3 wherein said window screen is sized to overlap said frame in a position of maximum dimensional adjustment, said window screen being trimmable to substantially conform dimensionally to the periphery of said frame after adjustment.

5. The visual communicator as defined by claim 4 including means for securing said window screen to the periphery of said frame after trimming.

6. The visual communicator as defined by claim 5 wherein said adjustable frame is comprised of at least four tubular members adapted to be secured in a generally rectangular configuration, said window screen also having a generally rectangular configuration dimensioned to overlap each of said tubular members of said frame.

7. The visual communicator as defined by claim 6 wherein said tubular members are generally square in cross section and including a connector member for joining adjacent ends of said tubular members.

8. The visual communicator as defined by claim 7 wherein each of said connector members includes a first portion adapted for insertion into one of said tubular members and a second portion adapted for insertion into the next adjacent of said tubular members.

9. The visual communicator as defined by claim 8 including hinge means joining said first and second portions of each of said connector members for assembly of said adjustable frame, said hinge means accommodating pivotal movement of one of said tubular members relative to the next adjacent of said tubular members to form a right angle during assembly of said adjustable frame, said hinge means being rendered inoperative after assembly of said adjustable frame.

10. The visual communicator as defined by claim 6 wherein said means for securing said window screen to the periphery of said frame includes a plurality of screen retaining caps, said caps being adapted to securely retain said window screen in substantially conforming overlapping relation to at least three of said tubular members of said adjustable frame.

11. The visual communicator as defined by claim 10 wherein said window screen includes a pocket along one edge adapted to receive one of said tubular members of said adjustable frame, said message display unit being disposed adjacent said pocket, said caps being adapted to securely retain the other three edges of said window screen in substantially conforming overlapping relation to the other three of said tubular members of said adjustable frame.

12. The visual communicator as defined by claim 11 wherein said message control unit is operationally interconnected to said light emitting diodes by means of electrical wires, said electrical wires extending from said light emitting diodes to said message control unit through a second pocket in said window screen, said second pocket extending along said window screen between said light emitting diodes and said pocket adapted to receive one of said tubular members.

13. The visual communicator as defined by claim 11 wherein at least said tubular members to be overlapped by edges of said window screen each have a pair of longitudinally extending projections on oppositely facing parallel surfaces thereof, each of said caps being in the form of a longitudinally extending channel defined by a pair of parallel walls joined along corresponding edges thereof by a top wall, said channels each having a pair of longitudinally extending indentations to cooperate with the corresponding pairs of longitudinally extending projections on inwardly facing parallel walls thereof.

14. The visual communicator as defined by claim 13 wherein said trimmable edges of said window screen are trimmable to overlap said pairs of longitudianally extending projections on said oppositely facing parallel surfaces of said tubular members, each of said caps being adapted to be pressed onto one of said tubular members after said trimmable edges of said window screen have been made to overlap said pairs of longitudinally extending projections, said pairs of longitudinally extending indentations on said inwardly facing parallel walls of said channels cooperating with said pairs of longitudinally extending projections on said oppositely facing parallel walls of said tubular members to securely retain said window screen in substantially conforming overlapping relation to said tubular members.

15. The visual communicator as defined by claim 6 wherein each of said tubular members includes a plurality of break points adjacent at least one end thereof, said break points facilitating adjustment of said frame to substantially conform to the periphery of said rear window of said vehicle.

16. The visual communicator as defined by claim 15 wherein said tubular members are generally square in cross section and including a connector member for joining adjacent ends of said tubular members.

17. The visual communicator as defined by claim 16 wherein each of said connector members includes a first portion adapted for insertion into one of said tubular members and a second portion adapted for insertion into the next adjacent of said tubular members.

18. The visual communicator as defined by claim 17 including hinge means joining said first and second portions of each of said connector members for assembly of said adjustable frame, said hinge means accommodating pivotal movement of one of said tubular members relative to the next adjacent of said tubular members to form a right angle during assembly of said adjustable frame, said hinge means being rendered inoperative after assembly of said adjustable frame.

19. The visual communicator as defined by claim 18 wherein said means for securing said window screen to the periphery of said frame includes a plurality of screen retaining caps, said caps being adapted to securely retain said window screen in substantially conforming overlapping relation to at least three of said tubular members of said adjustable frame.

20. The visual communicator as defined by claim 19 wherein said window screen includes a pocket along one edge adapted to receive one of said tubular members of said adjustable frame, said message display unit being disposed adjacent said pocket, said caps being adapted to securely retain the other three edges of said window screen in substantially conforming overlapping relation to the other three of said tubular members of said adjustable frame.

21. The visual communicator as defined by claim 20 wherein said message control unit is operationally interconnected to said light emitting diodes by means of electrical wires, said electrical wires extending from said light emitting diodes to said message control unit through a second pocket in said window screen, said second pocket extending along said window screen between said light emitting diodes and said pocket adapted to receive one of said tubular members.

22. The visual communicator as defined by claim 21 wherein at least said tubular members to be overlapped by edges of said window screen each have a pair of longitudinally extending projections on oppositely facing parallel surfaces thereof, each of said caps being in the form of a longitudinally extending channel defined by a pair of parallel walls joined along corresponding edges thereof by a top wall, said channels each having a pair of longitudinally extending indentations to cooperate with the corresponding pairs of longitudinally extending projections on inwardly facing parallel walls thereof.

23. The visual communicator as defined by claim 22 wherein said trimmable edges of said window screen are trimmable to overlap said pairs of longitudinally extending projections on said oppositely facing parallel surfaces of said tubular members, each of said caps being adapted to be pressed onto one of said tubular members after said trimmable edges of said window screen have been made to overlap said pairs of longitudinally extending indentations on said inwardly facing parallel walls of said channels cooperating with said pairs of longitudinally extending projections on said oppositely facing parallel walls of said tubular members to securely retain said window screen in substantially conforming overlapping relation to said tubular members.

24. The visual communicator as defined by claim 23 including means for securing said adjustable frame in said rear window of said vehicle, said securing means comprising a plurality of suction cup fasteners associated with said adjustable frame, said suction cup fasteners being adapted to cooperate with said rear window of said vehicle.

* * * * *